Sept. 15, 1942.　　　G. BOTTERON　　　2,295,927
WATER INDICATOR FOR FUEL SYSTEMS
Filed March 18, 1939　　　2 Sheets-Sheet 1
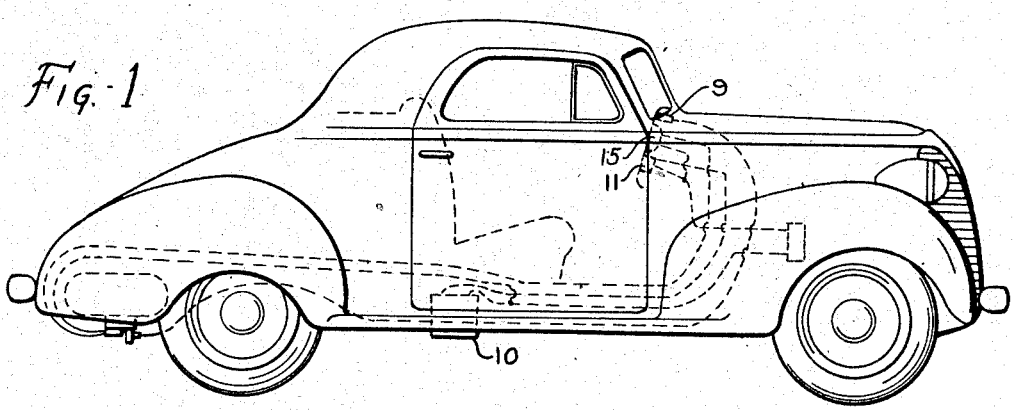
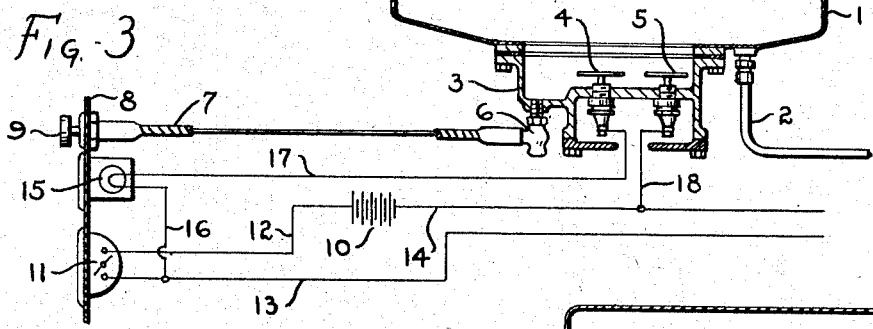
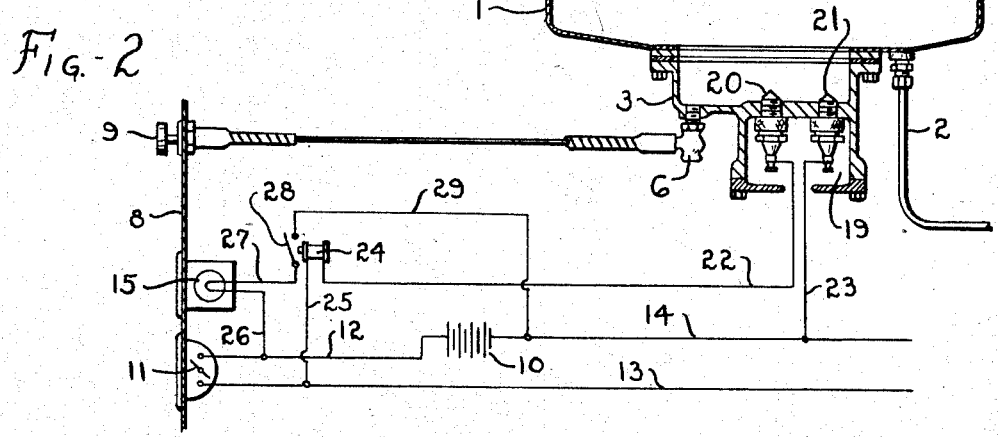
INVENTOR.
Gerald Botteron
BY: Cox & Moore
ATTORNEYS.

Sept. 15, 1942.　　　G. BOTTERON　　　2,295,927
WATER INDICATOR FOR FUEL SYSTEMS
Filed March 18, 1939　　　2 Sheets-Sheet 2
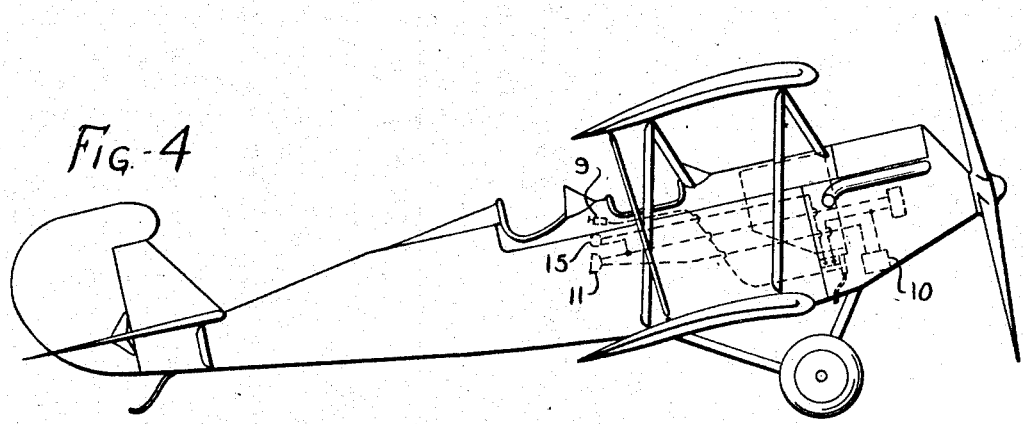
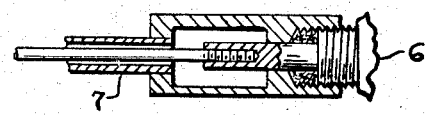
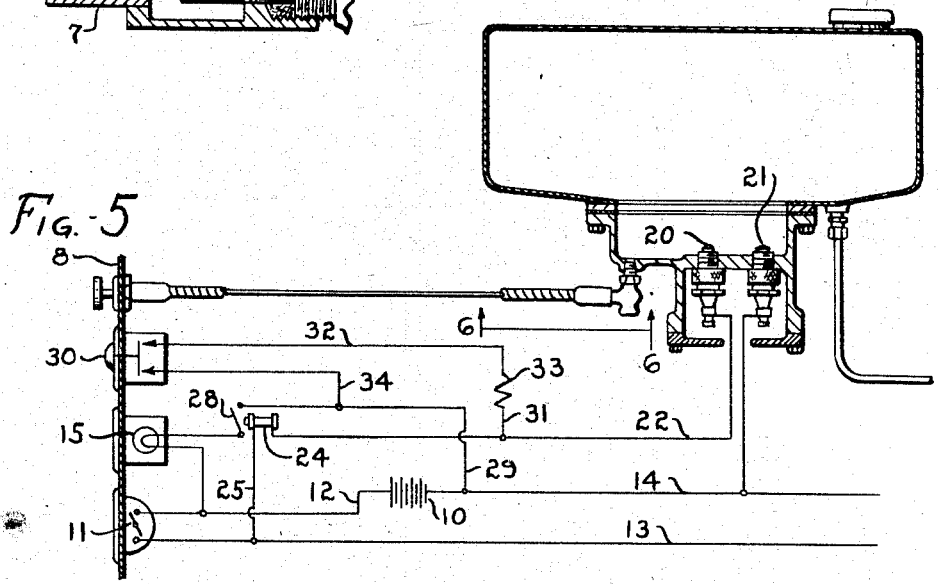
INVENTOR.
Gerald Botteron
BY: Cox & Moore
ATTORNEYS.

Patented Sept. 15, 1942

2,295,927

UNITED STATES PATENT OFFICE 2,295,927

WATER INDICATOR FOR FUEL SYSTEMS

Gerald Botteron, Fort Wayne, Ind., assignor to Tokheim Oil Tank and Pump Company, Fort Wayne, Ind., a corporation of Indiana Application March 18, 1939, Serial No. 262,625

1 Claim. (Cl. 177—311)

This invention relates to devices for indicating the presence of and/or for discharging water from fuel tanks of vehicles powered by internal combustion engines, such as automobiles, marine craft, airplanes, and other aircraft.

Under the present practice, it is the duty of the pilot, before taking off, to drain a small portion of the liquid from the fuel supply tank to relieve any accumulated water which may be present in the fuel tanks. Water is a great hazard and undesirable in air transportation due to its accumulation in the fuel tanks, either from condensation of the moisture in the atmosphere or by being present in the fuel when delivered into the fuel tank. A small percentage of water is at all times in suspension in gasoline and in the surging of the fuel in the tank during flight, this water comes in contact with the relatively cool metal walls of the containing tank. This causes the water to condense and to accumulate in the bottom of the tank. On long flights, a pilot carries several hundred gallons of gasoline and because he does not return to ground for several hours no opportunity is provided for this accumulated water to be drained from the tank.

The present invention constitutes a safeguard to the pilot in that it provides an accurate means of detecting instantly the presence of any appreciable body of accumulated water in the fuel tank. Under certain circumstances water and gasoline may be mixed in such a manner that they will remain substantially miscible during the filling of the fuel tanks. For instance, an enemy sympathizer during war might easily fill a fuel tank with gasoline and a high percentage of water without detection. However, with the present invention, and due to the relatively quick stratification of the water and gasoline in the fuel tank, the presence of the water therein will be indicated soon after the filling of the tank. In the adaptation of the present invention to airplanes, the pilot is at all times in position to know whether water is present in his fuel tank, be the plane in the air or on the ground before taking off. The present device readily indicates to the pilot that water has formed in the fuel tank and also provides means instantly operable for removing such water and without discharging even a portion of the gasoline.

The present invention is adaptable to automobiles, airplanes and other air and marine craft powered by internal combustion engines, wherein electrode means forming a part of the water separating device is especially constructed to co- operate with the low voltage of the ignition system.

Among the objects of the invention are to provide a device peculiarly adapted to automobiles, airplanes, marine and other aircraft powered by internal combustion engines, for indicating the presence of and/or for discharging accumulated water from the fuel in the fuel tank; to provide such a device wherein the water indicating and separating means are especially constructed for cooperation with the low voltage ignition systems of the internal combustion engines of airplanes, marine craft, automobiles and other aircraft; to provide means for checking the indicating means for such water separating devices; to provide these and other objects as will be more evident from a perusal of the following specification when taken in connection with the accompanying drawings, wherein:

Fig. 1 is a perspective view showing the invention as applied to an automobile;

Fig. 2 is a view somewhat diagrammatic in form, showing the invention as applied to the fuel tank of an internal combustion engine and partly showing its ignition system;

Fig. 3 is a modification of the invention shown in Fig. 2;

Fig. 4 is a view in perspective showing the invention as applied to an airplane;

Fig. 5 is still another modification of the invention; and

Fig. 6 is a view in sectional detail of a portion of the water discharging apparatus.

The invention is most simply illustrated in connection with the ignition system of the internal combustion engine of an automobile or other marine or aircraft. In some aspects of the invention, when used with a Diesel engine, a simple electrical circuit with a battery or other source of current of sufficient strength may be used.

In Fig. 3 the usual fuel tank is shown at 1, having attached to its intermediate section a fuel supply line 2 and provided with a sump 3 attached to its lower portion. Extending into this sump are two electrodes 4 and 5 which are insulated from their mountings or from the sump 3. The contact portions of these electrodes are shown as substantially enlarged and preferably in the form of large plates of any contour which will give a large surface of contact.

It will be noted that the plates 4 and 5 are supported in substantially spaced relation from the bottom of the sump. As thus constructed, a substantial body of water will accumulate in the sump before the upper level thereof reaches the plate electrodes 4 and 5 and form a bridging conductor therebetween, or conversely before the level will drop therebelow and break the circuit. In some instances with this arrangement of Fig. 3, the valve 6 may be operated by a solenoid electrically connected in the circuit 17 and 18 so that when the circuit is made through the electrodes the discharge valve will be automatically opened and will automatically close when the water level lowers. Thus no gasoline can be discharged.

These enlarged contacts are necessary in the arrangement shown in Fig. 3 when used in connection with the conventional ignition systems of internal combustion engines. Practically all such ignition systems use either 6 or 12 volts. With ordinary sized electrodes, such for instance as shown in Fig. 2, one is unable to get enough current from one electrode to the other through water to illuminate even a small signal light bulb. For instance, with a 6-volt battery hooked up by means of ordinary electrodes to a 1.2-volt bulb in the circuit, water offers too great a resistance and the light cannot be illuminated. However, by employing large plates, such for instance of a diameter of substantially two and one-half inches, such a small bulb can be illuminated. Fig. 3 shows a drain valve disposed in the bottom of the sump some distance below the operating electrical contact level of the electrodes within the sump. This drain valve or water discharging means is operatively controlled remotely by the usual Bowden wire control device 7 from the instrument panel 8. The control device is provided with a control knob 9, which when operated actuates the valve 6 to drain the water which has accumulated in the bottom of the sump. When this water has been drained, the control valve is actuated to closed position.

Referring to the electrical circuits connected to the electrodes 4 and 5, the same include a battery 10, which is preferably the conventional ignition circuit battery of 6 or 12 volts, in circuit with an ignition switch 11 by wires 12, 13 and 14. This circuit includes the primary of the ignition coil of the ignition circuit. In addition, a signal bulb or light 15 is shown attached to panel 8 and is connected by wire 16 to the wire 13 of the ignition circuit. The other side of the signal light is connected by wire 17 to the electrode 4. The electrode 5 is connected to the wire 14 by the wire 18. When the ignition switch 11 is closed, wires 12, 13 and 14 and battery 10 constitute a part of the primary ignition circuit, and when this circuit is closed, if water be present in the sump 3 sufficient to cover or bridge electrodes 4 and 5, current will flow between the electrodes by the conductivity of the water, and in turn will illuminate the bulb 15. If only gasoline or other motor fuel be present, no current will flow because gasoline is not a conductor of electricity.

When the operator or pilot is thus warned of the presence of a body of accumulated water in the sump, he may operate the Bowden control to open the valve 6 so that the water will be discharged. Immediately the discharging water reaches a level below that of the plates and the space therebetween is replaced by the upper level of gasoline, the flow of electrical current will be cut off and the light will be extinguished, at which time the pilot will then close the valve before any gasoline will have been discharged through the valve 6.

In some instances, as in Fig. 3, it may be desirable to place the operating level of the electrodes sufficiently above the valve outlet so that a substantial body of water is always present in the sump above the valve. A substantial safeguard is thus provided for preventing the inadvertent discharge of gasoline. In constructions where the fuel tank is located in the wing of the airplane, the electrical connections and the Bowden wire control will extend therefrom to the panel in the operating compartment of the craft.

The device shown in Fig. 2 of the drawings is a more practicable construction for operating the indicating device. In this construction the tank 1 is provided with the sump 3 and valve 6, together with the fuel supply line 2, just as in Fig. 3 of the drawings. In this construction the electrodes are shown to be only normal size. The metallic conductor in each electrode 20 and 21 is suitably insulated from the sump. As shown, each electrode is threaded upwardly through the bottom of the sump so that the electrically operating terminal is somewhat above the level of the discharge valve 6 in the sump, whereby a substantial body of water will accumulate within the bottom of the sump before it bridges over the space between these electrodes to make the circuit therebetween.

On the control panel 8 is shown the same signal bulb 15, ignition switch 11, and valve control knob 9. In the primary ignition circuit the battery 10 is connected to the switch 11 by the wire 12. The remainder of the circuit is made up of the wires 13 and 14. The two electrodes shown in Fig. 2, numbered 20 and 21, are connected with the circuit by means of wires 22 and 23, respectively, wire 23 joining wire 14, and wire 22 connecting to a relay coil 24. The other side of the coil 24 is connected to the wire 13 by the wire 25. One side of the signal light 15 is connected to the wire 12 by means of the wire 26, and the other side is connected to the relay switch 28 by means of the wire 27 and the relay switch 28 returned directly to the wire 14 by the wire 29. Wires 13 and 14 continue to the ignition circuit, as shown in Fig. 3.

Therefore in this circuit when the ignition switch 11 is closed and water is present in the sump 3 to close the circuit between the electrodes 20 and 21, the current will flow from the battery 10 to the wire 14, to wire 23 into electrode 21 through the water to electrode 20. The current then follows wire 22 to the relay coil 24 which is made to operate on a very low current. The current passes on to the battery 10 by means of the wire 25, wire 13, switch 11 and wire 12. The small amount of current which flows through the relay coil 24 energizes the relay, causing it to act on the switch 28 of the relay, and close the switch. Then the full voltage of 6 or 12 volts will flow from the battery 10 by the wire 29, switch 28 and wire 27 to the signal light 15. The remainder of this circuit is the wire 26, wire 12 returning to the battery 10. With this type of electrical hook-up, a normal size 6 or 12-volt bulb can be utilized in the circuit and will be fully illuminated.

In this type of circuit the electrodes may be located substantially above the level of the discharge valve and a solenoid operated discharge valve for the sump may be inserted in series in the relay circuit for automatically opening and closing the discharge valve of the sump, and without any possibility of discharging gasoline. In short, the water level will be maintained substantially at the operating level of the electrodes.

In some instances it is desirable to utilize an additional element to the invention as shown in Fig. 5. As the pilot should always be able to check his instruments to determine if they are constantly in good operating condition, a test switch is provided and mounted on the panel or dash 8. The purpose of this test switch is so that the pilot at any time when the ignition switch is closed may determine if the signal bulb 15, relay and other parts of the indicator circuits are effective. In Fig. 5, the same electrical circuits are employed except with the addition of the wire 31 connected to the wire 22. Between wires 31 and 32 a resistance 33 is inserted. Wire 32 connects to one side of test switch 30, the other side of which is connected to the wire 34, which in turn is connected to the wire 29. The resistance 33 is installed in the circuit to replace the resistance offered by the water between the electrodes 20 and 21. If an electrical relay could be provided which would stand an overload of the full voltage, this resistance would be unnecessary.

In this modified form of the invention, when the switch 11 is closed and the light 15 is not burning, the circuit may be tested by closing the switch 30 so that current from the battery may flow through the wire 14 to the wire 29, through the wire 34 to switch 30, and thence through wire 32, resistance 33, wire 31, wire 22 back to the relay 24, through the relay 24, wire 25 to wire 13, and through switch 11 and wire 12 to the battery 10. Thus the switch 30 and its circuit has performed the same function as the water and electrodes 20 and 21 and the relay 24 is energized. This closes the relay switch 28, and if all other parts are in operable condition, the light 15 will be illuminated.

In addition to the foregoing, I may utilize a very low reading indicator built on the order of a milliameter or millivoltmeter designed to operate on the same amount of current as the relay coils shown in the drawings, to indicate by a hand on a dial when water is present. This construction would replace the signal light bulb as an indicator, and this type of instrument could be made to operate on a very much lower current than a light bulb and hence would not need a relay to increase the voltage as is necessary for a light bulb signal indicator.

The invention is hereby claimed as follows:

A signal system for indicating the presence of undesired water in a tank for other liquid, said system comprising means providing spaced contacts disposed in a portion of said tank in which the undesired water may accumulate, a first circuit including in series a low voltage source and said spaced contacts, an electrically operable relay in said first circuit for energization by said source when said first circuit is closed by water bridging said spaced contacts, a relay controlled circuit energized by the low voltage source, said relay controlled circuit including a switch operated by said relay, an indicator in said relay controlled circuit and responsive to the closure of the switch in said relay controlled circuit for indicating the presence of water in said tank, and an additional circuit energized by the low voltage source and including in parallel with said electrodes a manually operable switch and a resistance equivalent to the resistance of the space between said spaced electrodes when bridged by water for testing the operability of the relay and the indicator.

GERALD BOTTERON.